Figure 1:
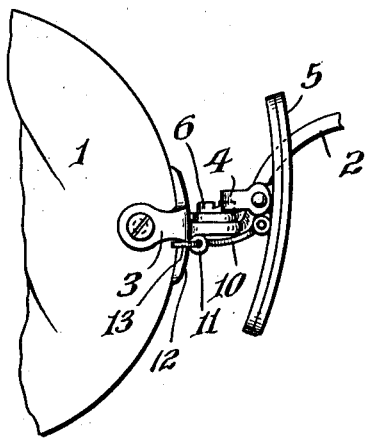

D. V. BROWN.
FINGER PIECE EYEGLASS MOUNTING.
APPLICATION FILED OCT. 14, 1910.

1,031,319.

Patented July 2, 1912.

INVENTOR
Daniel V. Brown

WITNESSES
Daniel Webster, Jr.
William Conway.

BY Cyrus N. Anderson
ATTORNEY

COLUMBIA PLANOGRAPH CO., WASHINGTON, D. C.

UNITED STATES PATENT OFFICE.

DANIEL V. BROWN, OF PHILADELPHIA, PENNSYLVANIA.

FINGER-PIECE EYEGLASS-MOUNTING.

1,031,319.  Specification of Letters Patent.  Patented July 2, 1912.

Application filed October 14, 1910. Serial No. 586,998.

*To all whom it may concern:*

Be it known that I, DANIEL V. BROWN, a citizen of the United States, residing in the city and county of Philadelphia, State of Pennsylvania, have invented certain new and useful Improvements in Finger-Piece Eyeglass-Mountings, of which the following is a specification.

My invention relates to improvements in eyeglasses of the character in which the nose guards or nose bearing pieces are supported upon pivoted levers or arms; but more particularly it relates to improvements in the springs employed in the construction of such glasses and to the means for supporting the said springs upon and connecting them to the other parts of the mounting.

The object of my invention is to provide a spring which may be readily adjusted for the purpose of varying the pressure of the nose bearing pieces or guards upon the nose of a wearer and also to provide an improved means of connecting the said spring to the means for connecting the lenses of a pair of eyeglasses and to the nose bearing pieces or guards.

To these and other ends, my invention comprehends the combination and arrangement of parts as hereinafter described in the specification, illustrated in the drawings, and set forth specifically in the claims.

It is to be understood that changes in the details of construction may be made within the scope of my invention as the same is set forth in the specification and claims.

Figure 2:
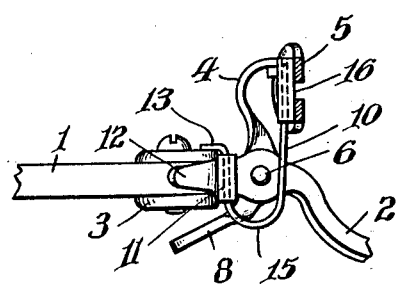
Figure 3:
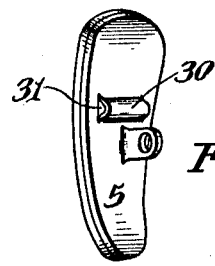

In the drawings:—Figure 1 is a rear elevation of a portion of a pair of eyeglasses provided with my invention; Fig. 2 is a bottom plan view of the same,—the guard being shown in section; and Fig. 3 is a perspective view of a guard provided with a modified construction of means by which the rear end of the spring may be operatively connected thereto.

In the drawings, I have illustrated a portion only of a single lens and a portion only of the means for connecting the two lenses of a pair of eyeglasses together. In view of the fact that both portions of a pair of eyeglasses upon opposite sides of the central portion of the bridge are the same, it is deemed unnecessary to show in the drawings a pair of eyeglasses complete.

Referring to the drawings: 1 designates the lenses and 2 the bridge of a pair of eyeglasses.

3 designates the straps by means of which the bridge is connected to the lenses.. The bridge together with the straps (or other means which may be employed for connecting the opposite ends of the bridge to the lenses) constitute the means for connecting together the two lenses of a pair of eyeglasses. In the construction shown, the strap 3 is formed integrally with the bridge but it will be understood that the bridge and the strap may be made separately and the two connected together in any manner desired.

4 designates the levers or arms upon which the nose bearing pieces or guards 5 are supported. The levers or arms 4 are pivoted at 6 to the opposite ends of the bridge 2.

8 designates projections of the levers or arms 4 which extend forwardly from the pivot points 6 and by means of which the levers or arms 4 are operated for the purpose of moving the nose bearing pieces or guards 5 in and out to place the glasses upon the nose or for any other purpose.

Referring to Figs. 1 and 2, 10 designates the springs of a pair of eyeglasses which springs are round in cross section, although they may be of any other cross-sectional shape or contour. The forward ends of the springs extend through tubular supporting sleeves 11 which in the construction shown are located underneath the opposite ends of the bridge 2, and are secured in the angles between the opposite ends of the bridge and the downwardly extending stays 12 of the straps 3. Of course the location of the supporting means 11 may be varied to other positions if found desirable. The ends of the springs which extend through the supporting means 11 are bent laterally against the strap 3 as shown at 13. Each of the springs extends forwardly from its supporting means 11 and then inwardly and rearwardly to form the bend or curve 15. The rear ends of the springs extend into tubular devices 16 which are secured to the nose bearing pieces or guards 5. The openings through the devices 11 and 15 should be tubular or any other contour to correspond to the cross-sectional contour of the springs. Preferably the ends of the springs fit loosely in the devices 16 so that when the levers or arms 4 are moved about their pivots 6 for the purpose of moving the nose bearing pieces or guards 5 in and out. the said devices 16 may move longitudinally with respect to the springs 10. It is also to be noted that preferably the said springs fit loosely in the supporting devices 11. The springs may extend entirely through the openings in the devices 16 or may terminate at points intermediate the ends of said openings if desired. The presence of the bends or curves 15 increases very materially the spring action of the spring. Although the cross-sectional contour of the said spring and also of the member 16 may be changed, still the construction embodying my invention is such that an old or broken spring may be replaced by a new spring by any one whether a skilled or an unskilled optical mechanic. By reason of the length of the spring, it is obvious that it may be adjusted by bending so as to vary its tension and thus vary the amount of pressure exerted by the nose bearing pieces or guards upon the nose of a wearer.

In Fig. 3 I have shown a construction of nose bearing piece or guard in which the central portion thereof is stamped and pressed out as indicated at 30 for the purpose of forming means which may be employed instead of the means 16 shown in Figs. 1 and 2 for connecting or supporting the rear ends of the springs in proper operative relation to the said nose bearing pieces or guards. The pressing upwardly or upsetting of a central portion of the material of the guard as indicated at 30 forms an opening 31 underneath the said upset portion 30 into which the rear ends of the springs may be projected.

Having thus described my invention, I claim:—

1. In eyeglasses, in combination, lenses, means for connecting the said lenses together, arms pivotally supported upon the said means and extending rearwardly therefrom, nose bearing pieces secured upon the rear ends of the said arms, tubular devices secured to the said means for connecting the lenses at points adjacent to the edges of said lenses, springs extending through the said tubular members and provided with means for preventing accidental removal of the same therefrom, and tubular members having connection with said nose pieces, said springs being extended from the said first-named tubular members to and through the tubular members which have connection with the said nose pieces.

2. In eyeglasses, in combination, the lenses, means for connecting the said lenses, arms pivotally supported upon the said means and extending rearwardly therefrom, nose bearing pieces secured upon the rear ends of the said arms, devices secured to the means for connecting the lenses adjacent to the inner edges of the lenses, which devices are provided with openings extending therethrough, springs having their forward ends extended through the said openings, the said springs extending forwardly, inwardly and rearwardly from the said devices, and devices upon the said nose bearing pieces having openings therein into which the rear ends of the said springs extend and are thereby operatively connected to the said nose bearing pieces.

3. In eyeglasses, in combination, the lenses, means for connecting the said lenses, arms pivoted to the said means and extending rearwardly from their points of connection, nose bearing pieces secured upon the rear ends of the said arms, tubular bearing devices connected with the opposite ends of the means for connecting the said lenses adjacent to the inner edges of the latter, springs supported in the said tubular devices, the said springs extending forwardly, inwardly and rearwardly to the said nose bearing pieces, tubular devices on the said nose bearing pieces into which the rear ends of the springs extend, whereby the said springs and nose bearing pieces are operatively connected.

In testimony that I claim the foregoing as my invention, I have hereunto signed my name this 13th day of October, A. D. 1910.

DANIEL V. BROWN.

In the presence of—
 IRVIN SHUPP, Jr.,
 CYRUS N. ANDERSON.

---

Copies of this patent may be obtained for five cents each, by addressing the "Commissioner of Patents, Washington, D. C."